(12) United States Patent
Goebel (10) Patent No.: US 6,939,633 B2
(45) Date of Patent: Sep. 6, 2005

(54) FUEL CELL SHUTDOWN AND STARTUP USING A CATHODE RECYCLE LOOP

(75) Inventor: Steven G. Goebel, Victor, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/664,329

(22) Filed: Sep. 17, 2003

(65) Prior Publication Data

US 2005/0058859 A1 Mar. 17, 2005

(51) Int. Cl.[7] .............................................. H01M 8/04
(52) U.S. Cl. ............................ 429/17; 429/13; 429/30
(58) Field of Search ............................ 429/13; 420/17, 420/30

(56) References Cited

U.S. PATENT DOCUMENTS

| | | | |
|---|---|---|---|
| 6,312,842 B1 * | 11/2001 | Reiser et al. | 429/13 |
| 6,376,112 B1 * | 4/2002 | Clingerman et al. | 429/17 |
| 6,391,485 B1 * | 5/2002 | Perry | 429/13 |
| 6,514,635 B2 | 2/2003 | Van Dine et al. | 429/17 |
| 2002/0076582 A1 | 6/2002 | Reiser et al. | |
| 2002/0076583 A1 * | 6/2002 | Reiser et al. | 429/13 |
| 2002/0098393 A1 | 7/2002 | Dine et al. | |
| 2002/0102443 A1 | 8/2002 | Yang et al. | |

* cited by examiner

Primary Examiner—Dah-Wei Yuan
(74) Attorney, Agent, or Firm—Cary W. Brooks (57) ABSTRACT

A method and device for operating a fuel cell system. A recirculation loop coupled to a fuel cell cathode ensures that fluids passing through the cathode are recycled, thereby enabling reaction between residual oxygen in the recycled fluid and fuel that has been introduced into the recirculation loop until substantially all of the oxygen is reacted, leaving a substantially oxygen-free, predominantly nitrogen compound in the cathode and related flowpath. Thereafter, this compound can be redirected to purge the remaining residual hydrogen resident in the fuel cell's anode and related flowpath. While the present invention is usable during any period of system operation, it is especially valuable for operational conditions associated with starting up and shutting down a fuel cell system to inhibit the formation of high voltage potentials that could otherwise damage fuel cell catalysts or catalysts supports.

41 Claims, 4 Drawing Sheets

FUEL CELL SHUTDOWN AND STARTUP USING A CATHODE RECYCLE LOOP

BACKGROUND OF THE INVENTION

The present invention relates generally to operating a fuel cell system, and more particularly to starting up and shutting down a fuel cell in such a way as to minimize oxidation of catalyst support material while maintaining system simplicity.

The use of catalysts to facilitate the electrochemical reaction between hydrogen and oxygen in fuel cell is well-known. Typically, the catalyst is in the form of a noble metal powder that is distributed on a support that is itself a powder of larger carbon or carbon-based particles. This powder-based approach allows for a significant increase in surface area upon which the aforementioned reaction can take place. While such a configuration provides for an efficient, compact reactor that by spreading the relatively expensive catalyst (such as platinum) over a large area results in significant improvements in power output with simultaneous reduction in raw material cost, its effectiveness can be limited by certain modes of operation. For example, even when the need for electric current produced in a fuel cell is reduced or ceases, the residual oxygen and hydrogen reactants continue to generate an open circuit voltage (typically around 0.9 V or higher) that can lead to catalyst and catalyst support oxidation, thereby reducing fuel cell life. Of even neater concern is the presence of a hydrogen-air interface on one of the fuel cell electrodes (such as the anode) while air is present on the other electrode (such as the cathode), which can lead to potentials of between 1.4 V and 1.8 V being generated. These elevated potentials exacerbate the aforementioned corrosion of the catalyst and catalyst support material. This situation can occur during startup (when air is being purged by hydrogen) and during shutdown (when air is entrained into the anode as hydrogen is consumed by cross-over). The present inventors have observed that operational transients, particularly repeated system startup and shutdown, appear to shorten fuel cell life much faster than the comparable steady-state operation that takes place between such transients.

One way to alleviate the problem of residual fuel and oxidant is to inject an inert gas to purge both the anode flowpath and the cathode flowpath immediately upon cell shutdown. This could be accomplished by, for example, injecting onboard nitrogen into the anode and cathode flowpaths. However, this is disadvantageous, especially for many vehicle-based fuel cell systems, as the on-board use of a parasitic gaseous nitrogen supply would take up precious vehicle space otherwise used for passenger, comfort or safety features. Another approach is to introduce air into the anode flowpath so that the air can react with the residual hydrogen. By recirculating this mixture, the hydrogen can be ignited or catalytically reacted until virtually none remains. By this approach, no on-board nitrogen purge gas is required. However, this system is disadvantageous in that complex system componentry, including additional pumps coupled to intricate valve networks all tied together with precision control mechanisms, is required. Accordingly, there exists a need for a fuel cell system that can be started up and shut down without having to resort to approaches that require significant increases in weight, volume or complexity.

BRIEF SUMMARY OF THE INVENTION

These needs are met by the present invention, wherein a fuel cell system and a method of operating the system in such a way as to avoid the detrimental effects of operational transients on system components is disclosed. In accordance with a first aspect of the present invention, a method of operating a fuel cell system is disclosed. The fuel cell system includes at least one fuel cell made up of at least an anode, cathode and membrane disposed between the anode and cathode, in addition to an anode flowpath configured to couple the anode to a fuel source and a cathode flowpath configured to couple the cathode to an oxygen source. The aforementioned flowpaths may include support equipment necessary for the flow of fluids in and around the fuel cell, including piping and related conduit. Valves, pumps and related componentry, while also forming part of the flowpath, may also be individually discussed to more clearly identify their function within their respective flowpath. In the present system, a recirculation loop is formed in the cathode flowpath and in conjunction with connectivity between the cathode flowpath and anode flowpath provides a means for generating an inert gas without the high temperatures associated with undiluted, stoichiometric combustion. While one type of fuel cell that can benefit from the present invention is a proton exchange membrane (PEM) fuel cell, it will be appreciated by those skilled in the art that the use of other fuel cell configurations is also within the purview of the present invention. The operation of the present system occurs by decoupling the anode from the fuel source so that the flow of fuel is cut off, recycling fluid disposed in the cathode flowpath through the recirculation loop, introducing fuel into the recirculation loop so that it can be reacted with the recycled fluid until the recycled fluid becomes substantially oxygen-depleted, and then introducing the substantially oxygen-depleted fluid into the anode flowpath such that any fluid previously in the anode flowpath is substantially removed. The term "oxygen source" and its variants is to be understood broadly, encompassing any device, container or environment (including the ambient environment) configured to provide oxygen or a significant oxygen-bearing compound, mixture or the like.

Optionally, the method includes the step of fluidly coupling a pressure source to at least one of the fuel and oxygen sources. Such a pressure source (for example, an air compressor) may be used to pressurize fluid contained within the recirculation loop. The recycling step may further include closing a cathode exit valve and opening a cathode flowpath recycle valve, both valves disposed within the recirculation loop. In one form, the step of introducing the substantially oxygen-depleted gas into the anode flowpath can include opening a purge valve that fluidly couples the cathode flowpath to the anode flowpath. Preferably (although not necessarily) the purge valve is disposed between the cathode and the cathode exit valve. The step of introducing fuel into the recirculation loop may include adjusting a fuel inerting valve that fluidly couples the anode flowpath to the cathode flowpath. Along with the aforementioned purge valve, this valve provides a direct bridge between the two flowpaths.

The system may define at least a first operational state where the system is generating electricity, a second operational state where the system is not generating electricity, and a third operational state transiently between the first and second operational states. Such transient operation involves those periods of operation over which changes in system power output occur. Two times such operation is of particular concern to the present invention is during system startup and shutdown. As such, transient operation is distinguished over steady state operation, where the system output is substantially constant. In one mode of operation, the decoupling, recycling, reacting and both introducing steps make up the third operational state. An additional step includes filling the anode flowpath with fuel once the substantially oxygen-depleted fluid has substantially purged the anode flowpath. In this case, the system will be ready for normal operation (such as that associated with the aforementioned first operational state). One way to affect this last step is to fluidly isolate the anode flowpath from the cathode flowpath, and fluidly coupling the fuel source to the anode. For example, fluidly isolating the anode flowpath from the cathode flowpath comprises closing the previously discussed purge valve. The step of fluidly isolating the anode flowpath from the cathode flowpath may be achieved by closing the fuel inerting valve previously discussed. The step of fluidly coupling the fuel source to the anode can be performed by opening the fuel supply valve disposed within the anode flowpath. The flow of fuel can be adjusted until the system is operating normally in its first operational state. Another option includes bleeding fluid from the oxygen source into the anode during a period prior to normal operation, thereby providing additional heating to assist the system to more rapidly achieve optimal operating temperatures (for example, between 60° C. and 80° C.) during startup in low temperature environments. This bleeding step can include opening the purge valve. Similarly, fuel can be bled from the fuel source into the cathode during a comparable period, also to assist with low temperature starting. To achieve this, the fuel inerting valve is opened.

Another optional step involves regulating the amount of fuel being introduced into the cathode flowpath in order to maintain a substantially stoichiometric ratio between the fuel and the oxygen present in the recirculating fluid for the duration of the purge step. For example, the amount of oxygen present in the recirculating fluid can be sensed so that the fuel inerting valve can be adjusted by an amount necessary to maintain the substantially stoichiometric ratio. A controller can be included in the system so that the response to the sensed oxygen level can be performed automatically, such as by automated manipulation of one or more of the aforementioned valves. Regarding the reactants, it is preferred that the fuel be hydrogen-rich, examples of which are methanol, hydrogen, methane (such as from natural gas) and gasoline. In cases where the fuel from the fuel source is not substantially pure hydrogen, a fuel processing system (such as a methanol reformer or other such reactor known to those skilled in the art) can be used to supply substantially pure hydrogen to the fuel cell. A preferred source of oxygen is air. Preferably, the reacting step takes place in either or both a combustor that is fluidly coupled to the cathode flowpath and a catalyst disposed on the cathode. An additional step can be cooling the products produced during the reacting step. This can be achieved by placing a cooler between the combustor and the fuel cell. The step of introducing the substantially oxygen-depleted fluid into the anode flowpath may include fluidly coupling the cathode flowpath downstream of the cathode with an inlet location in the anode. Yet another additional step may include filling the anode flowpath with air once the previously resident fuel has been substantially removed. The step of filling the anode flowpath with air can be performed by closing the fuel inerting valve and opening the purge valve. In addition, the step of decoupling the anode from the fuel source can be accomplished by closing a fuel supply valve.

According to another aspect of the present invention, a method of preparing a fuel cell system for startup is disclosed. As before, the fuel cell system includes at least one fuel cell made up of at least an anode, cathode and membrane disposed between the anode and cathode, in addition to an anode flowpath configured to couple the anode to a fuel source and a cathode flowpath configured to couple the cathode to an oxygen source. In addition, it includes a plurality of valves configured to establish fluid communication between the anode flowpath and the cathode flowpath. The steps involved in the present method include introducing fuel from the fuel source into the cathode flowpath, recycling fluid disposed in the cathode flowpath through the recirculation loop, introducing fuel into the recirculation loop, reacting the fuel with the recycled fluid until the recycled fluid becomes substantially oxygen-depleted and introducing the substantially oxygen-depleted fluid into the anode flowpath such that any fluid previously resident therein is substantially purged therefrom.

Optionally, the step of introducing the substantially oxygen-depleted fluid comprises opening a (previously discussed) purge valve that fluidly couples the anode flowpath to the cathode flowpath, and subsequently opening a (previously discussed) fuel supply valve that fluidly couples the fuel source to the anode. Additionally, fluid can be bled from the oxygen source into the anode to facilitate low temperature starting. The step of bleeding air into the anode can include opening the purge valve disposed between the cathode flowpath and the anode flowpath. Moreover, fuel can be bled from the fuel source into the cathode to facilitate low temperature starting. The bleeding fuel step can be achieved by opening a fuel inerting valve similar to that previously discussed.

According to yet another aspect of the present invention, a method of transiently operating a fuel cell system is disclosed. The system is configured to define at least a first operational state where the system is generating electricity and a second operational state where the system is not generating electricity. Components within the system include at least one fuel cell, an anode flowpath, a cathode flowpath, all as previously described, a pressure source coupled to the oxygen source, and a plurality of valves, some of which are at least one valve disposed within the recirculation loop, a purge valve and a fuel inerting valve. Steps in this method include placing the system in one of the first or second operational states, decoupling the anode from the fuel source, arranging at least one valve disposed in the recirculation loop so that the fluid pressurized by the pressure source can be recycled through the loop, arranging the fuel inerting valve such that fuel can be introduced from the fuel source into the cathode flowpath, reacting the fuel with the recycled fluid until the recycled fluid becomes substantially oxygen-depleted and opening the purge valve such that the substantially oxygen-depleted fluid is introduced into the anode flowpath, thereby substantially purging the anode flowpath.

According to still another aspect of the invention, a device comprising at least one fuel cell comprising an anode, a cathode and a membrane disposed between the anode and cathode is disclosed. The device also includes an anode flowpath, a cathode flowpath and a plurality of valves configured to establish fluid communication between the anode flowpath and the cathode flowpath, all as previously described. The plurality of valves includes a fuel supply valve disposed between the fuel source and the anode, at least one valve disposed in the recirculation loop to selectively allow recycling of fluid in the loop, a fuel inerting valve and a purge valve.

Optionally, the device further includes a pressure source coupled to at least one of the fuel source and the oxygen source. In addition, the at least one valve disposed in the recirculating loop can be a plurality of valves, including a cathode exit valve configured to selectively control back-pressure in an exhaust line in the cathode flowpath and a cathode flowpath recycle valve disposed between the oxygen source and the pressure source. As previously discussed, the pressure source can be supplied by an air compressor. A combustor may also be included to promote reaction between fuel and oxygen. Also as before, a cooler may be fluidly coupled downstream of the combustor, while a catalyst may be disposed on the cathode to promote reaction between fuel and oxygen. A controller configured to regulate the amount of fuel being introduced into the cathode flowpath may additionally be included, where an oxygen sensor can be additionally included such that the controller is configured to manipulate the plurality of valves in response to a signal sent from the oxygen sensor. The device may further comprise a power conversion mechanism configured to take electricity generated by the fuel cell system and convert it to motive power, and may furthermore include a vehicle configured to house the fuel cell system and the power conversion mechanism. The vehicle (an example of which can be a car, truck, motorcycle, aircraft or watercraft) is movably responsive to the motive power generated in the power conversion mechanism.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

Figure 1A:
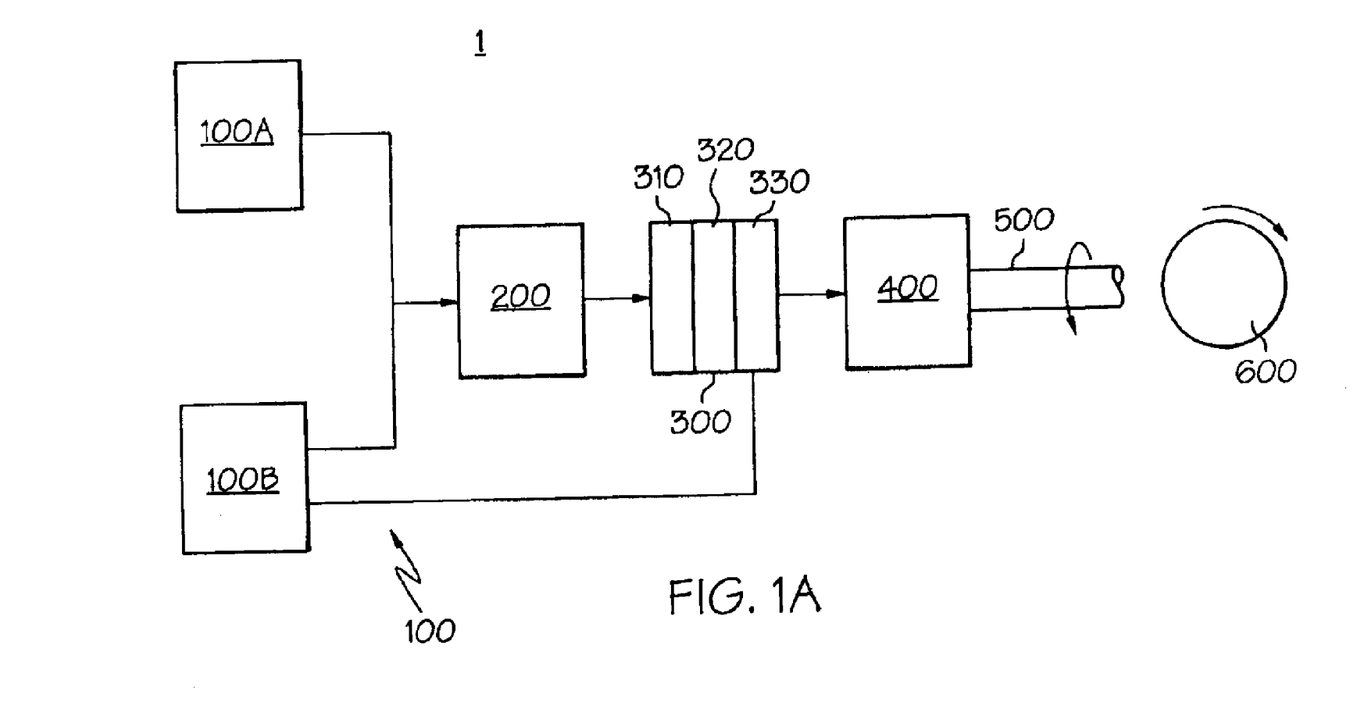
FIG. 1A shows a block diagram of a fuel cell system configured for vehicular application.

Referring initially to FIG. 1A, a block diagram highlights the major components of a mobile fuel cell system 1 according to the present invention. The system includes a fuel delivery system 100 (made up of fuel source 100A and oxygen source 100B), fuel processing system 200, fuel cell 300, one or more energy storage devices 400, a drivetrain 500 and one or more motive devices 600, shown notionally as a wheel. While the present system 1 is shown for mobile (such as vehicular) applications, it will be appreciated by those skilled in the art that the use of the fuel cell 300 and its ancillary equipment is equally applicable to stationary applications. It will also be appreciated by those skilled in the art that other fuel delivery and fuel processing systems are available. For example, there could be, in addition to a fuel source 100A and oxygen source 100B, a water source (not shown). Likewise, in some variants where substantially purified fuel is already available, the fuel processing system 200 may not be required. The energy storage devices 400 can be in the form of one or more batteries, capacitors, electricity converters, or even a motor to convert the electric current coming from the fuel cell 300 into mechanical power such as rotating shaft power that can be used to operate drivetrain 500 and one or more motive devices 600. The fuel processing system 200 may be incorporated to convert a raw fuel, such as methanol into hydrogen or hydrogen-rich fuel for use in fuel cell 300; otherwise, in configurations where the fuel source 100A is already supplying substantially pure hydrogen, the fuel processing system 200 may not be required. Fuel cell 300 includes an anode 310, cathode 330, and an electrolyte layer 320 disposed between anode 310 and cathode 330. Although only a single fuel cell 300 is shown, it will be appreciated by those skilled in the art that fuel cell system 1 (especially those for vehicular and related applications) may be made from a stack of such cells serially connected.

Figure 1B:
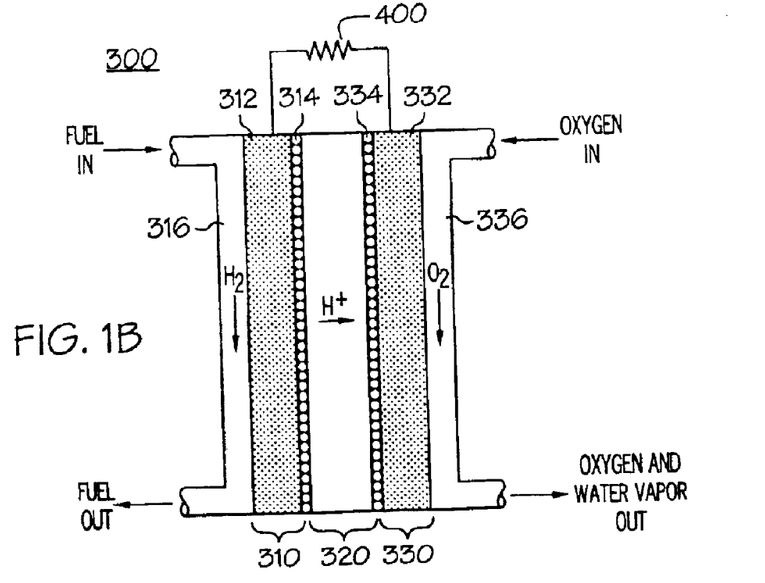
FIG. 1B shows a representative fuel cell from the system of FIG. 1A.
Figure 1C:
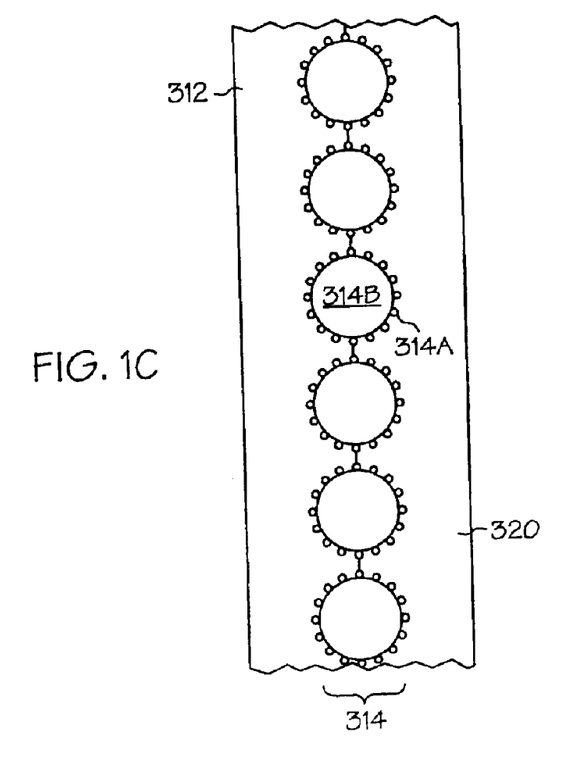
FIG. 1C shows an enlargement of the region between the anode and membrane of the fuel cell of FIG. 1B, highlighting the placement of a catalyst on a support, where the catalyst is used to facilitate the ionization of the fuel.

Referring next to FIGS. 1B and 1C, the anode 310 includes an electrode substrate 312 and catalyst layer 314 connected to a flow channel 316. The cathode 330 includes an electrode substrate 332 and catalyst layer 334 connected to a flow channel 336. Flow channels 316, 336 form the part of an anode flowpath and cathode flowpath (both described below) that contact their respective anode and cathode. Preferably, the electrode substrates 312, 332 are porous to allow diffusion of fuel and oxygen, as well as the flow of water that forms as a result of the fuel-oxygen reaction. The catalyst layer 314 is made up of a catalyst 314A dispersed on the surface of a support 314B. The electrolyte layer 320, shown presently in the form of a proton exchange membrane, is placed between each of the anode 310 and cathode 330 to allow the ionized hydrogen to flow from the anode 310 to the cathode 330 while inhibiting the passage of electrical current therethrough. Fuel (typically in the form of gaseous hydrogen) passes through flow channel 316, allowing the fuel to diffuse through electrode substrate 312 and come in contact with the catalyst 314A, through which the electrochemical oxidation of the hydrogen fuel proceeds by what is believed to be a dissociate adsorption reaction. This reaction is facilitated by catalyst 314A, typically in the form of finely-divided particles of a noble metal (such as platinum) that are dispersed over the surface of the support 314B, which is typically carbon-based. The positively-charged hydrogen ion (proton) produced at the anode 310 then passes through the electrolyte 320 to react with the negatively-charged oxygen ions generated at the cathode 330. The flow of liberated electrons sets up a current through the load 400 such that a motor or related current-responsive device may be turned. Load 400, shown in the form of the previously-discussed energy storage device, completes an electrical flowpath between the anode and cathode of fuel cell 300. An additional pump (not shown) can be included to remove from the electrode substrates 312, 332 water that would otherwise collect and possibly block the porous passageways.

Figure 2A:
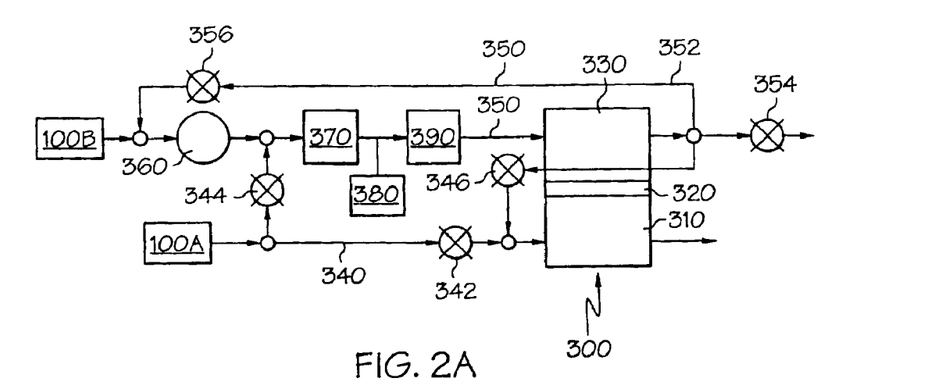
FIG. 2A shows a block diagram of a fuel cell system according to one aspect of the present invention.
Figure 2B:
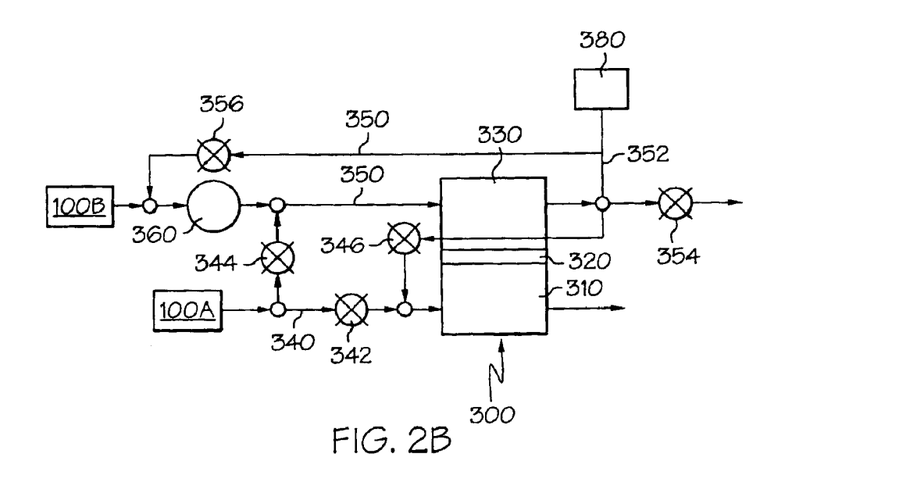
FIG. 2B shows a variation of the system of FIG. 2A.

Referring next to FIGS. 2A and 2B, block diagrams of variations on the present system, both configured to reduce the hydrogen-oxygen interface in fuel cell 300, are shown. An anode flowpath 340 fluidly couples fuel source 100A to the anode 310 through a fuel supply valve 342. Oxygen source 100B is fluidly coupled to the cathode flowpath 350 such that oxygen can be flowed past cathode 330. As shown with particularity in the figures, a recirculation loop 352 is placed in the cathode flowpath 350 to recycle a purge fluid (such as a nitrogen-rich gas) formed by the reaction of the hydrogen and oxygen. In addition to promoting the generation of the purge fluid through the consumption of oxygen, the recirculation loop 352 promotes uniformity of voltages between various cells. The recirculation loop 352 includes a pressure source 360, combustor 370, oxygen sensor 380 and cooler 390, all fluidly coupled to help pass various fluids repeatedly through the cathode 330 during operational transients so that specific species can be reduced through appropriate catalyzing or combustion reaction. Although only a single cooler 390 (which can be in the form of a heat exchanger) is depicted, it will be appreciated by those skilled in the art that additional coolers, as well as other locations for the cooler 390, may be used. By recycling the hydrogen, oxygen and generated purge fluid (collectively, the fluid being recirculated) several times through cooler 390, a smaller temperature rise is encountered, thus reducing thermal burdens on the system. A cathode exit valve 354 is disposed downstream of the cathode 330 to control the flow of fluid between the exhaust of cathode 330 and the recirculation loop 352, while a cathode flowpath recycle valve 356 allows selective introduction of the fluid being recirculated upstream of the cathode 330. Preferably, the pressure source 360 is an air compressor. The oxygen source 100B need not be shut off during operational transients (such as during startup or shutdown), as additional air tends to not flow into the recirculation loop 352 due to the presence of a dead head by virtue of the cathode exit valve 354 being closed. Fluid communication between the anode flowpath 340 and the cathode flowpath 350 is established though a fuel inerting valve 344 and a purge valve 346, which can be actuated independently or in tandem to achieve the desired fluid flow between the flowpaths 340, 350.

Another feature that can be incorporated into the present system is a combustor 370 (also known as a burner) placed in the recirculation loop 352 so that excess fuel can be burned. While the catalytic reaction between hydrogen and oxygen continues to occur at the cathode 330 as long as both reactants are present in the recirculation loop 352, the burning process enabled by combustor 370 can speed up the transient operation of the system by more quickly consuming the fuel, as well as reduce the likelihood of cathode overheating. To further speed up the reaction, a plurality of combustors can be used rather than a single combustor. Preferably, both the combustor 370 and the catalytic reaction at cathode 330 would be used to combine the best attributes of speed and completeness of hydrogen removal. In an additional feature, the combustor 370 could include catalytic elements disposed therein to further react the hydrogen with the oxygen in the air. In this case, the combustor elements (not shown) could be catalytically coated and electrically heated. In either configuration, the prompt and thorough removal of the reactable species is beneficial because it allows rapid starting and minimizes the aforementioned excess shutdown energy levels that would otherwise be generated as a result of the hydrogen-air interface formed on the anode. In such instances, without the system of the present invention, excessive voltage potentials can develop that will attack the support 314B.

The shutdown sequence of fuel cell system 1 preferably starts with closing fuel supply valve 342 to halt the flow of fuel to the anode 310. Next, the cathode exit valve 354 is closed while the cathode flowpath recycle valve 356 is opened to force the fluid exiting the cathode 330 into recirculation loop 352. In addition, the pressure source 360 (such as an air compressor) is operated to promote the fluid flow through the recirculation loop 352, although it will be appreciated that if fluid is already sufficiently pressurized, such additional pressure might not be needed. The recirculation loop 352 is needed to move the fluid though the combustor 370 or cathode 330 so that the air and fuel are mixed and reacted on the appropriate catalyst. Fuel inerting valve 344 can be adjusted during the period of fluid recirculation to allow the introduction of hydrogen to the recirculating fluid, thereby reacting with any oxygen still present therein. Oxygen sensor 380 can be used to track the oxygen still present in the recirculation loop 352. The oxygen sensor 380 can be used to maintain a stoichiometric ratio between hydrogen and oxygen in situations where continued purging, discussed below, is necessary. As shown with particularity in FIG. 2A, the reaction can occur on a catalyst in combustor 370, after which excess heat generated in the fluid by the combustion process can be reduced prior to introduction into the cathode 330 by passing the fluid through a heat exchanger (in the form of a cooler 390). Such a cooler could be dual-use, in that it may also be used to cool the air exiting the air compressor. An alternate configuration, depicted in FIG. 2B, allows the reaction to take place on a catalyst on cathode 330. This variant would embody a simpler arrangement of components, possibly eliminating the need for separate combustor and associated cooling mechanism. Depending on the speed of reaction required, one or both of the configurations in combination could be used. In either of the above configurations, once the oxygen in the recirculating fluid is consumed, purge valve 346 is opened to allow fluid communication between the anode flowpath 340 and cathode flowpath 350. This allows the (now substantially oxygen-free) fluid that hitherto this time had been entrained in the recirculation loop 352 to purge the anode 310 of residual fuel and other fluids. In cases where the fluid being used to provide oxygen to the cathode is air, it will be appreciated that once the oxygen is substantially removed, the remaining fluid will almost exclusively contain nitrogen with traces of other gases. Since the nitrogen is inert, its presence ensures a suitable benign fluid for purging the anode and cathode. In addition, the nitrogen itself can be easily purged as needed. Preferably, the purge fluid is withdrawn from exit of cathode 330 to take advantage of the entire volume of the cathode 330 for purging. While it is generally the case that the fluid capacity of the cathode within a fuel cell is greater than that of the anode, there could be circumstances where additional purge fluid is required for the anode. In such cases, the flow of fuel into the cathode loop 350 through fuel inerting valve 344 could be adjusted so that a substantially stoichiometric ratio between the fuel and oxygen in the cathode flowpath 350 can be maintained. A feedback-based controller (not shown) can be included, and based on signals transmitted by oxygen sensor 380, can be used to keep the desired fuel-to-oxygen ratio in the fluid passing through the recirculation loop 352. Once the hydrogen has been purged from the anode 310, it may then be purged with air (or other fluids, if desired). In this situation, the fuel inerting valve 344 is closed, allowing fluid in the recirculation loop 352 that has been pressurized by pressure source 360 to flow into the anode 310 through purge valve 346. This last step ensures that air is present on both the anode 310 and cathode 330 during periods of inactivity of fuel cell 300.

The startup sequence of fuel cell system 1 would involve closing cathode exit valve 354 while opening the cathode flowpath recycle valve 356 to force the fluid exiting the cathode 330 into recirculation loop 352. As with the aforementioned shutdown sequence, the pressure source 360 is operated to promote the fluid flow through the recirculation loop 352, if needed. Fuel inerting valve 344 can be adjusted during the period of fluid recirculation to allow the introduction of hydrogen to the recirculating fluid, thereby reacting with any oxygen still present therein. As before, the reactions can take place in the devices of either of the embodiments shown in FIGS. 2A and 2B on a catalyst in combustor 370, on the cathode 330, or both. Purge valve 346 is opened to allow fluid communication between the anode flowpath 340 and cathode flowpath 350. This allows the (now substantially oxygen-free) fluid that hitherto this time had been entrained in the recirculation loop 352 to purge the anode 310 of residual air and other fluids. Preferably, the purge fluid is withdrawn from the exit of cathode 330 to take advantage of the entire volume of the cathode 330 for purging. Also as before, the flow of fuel into the cathode loop 350 through fuel inerting valve 344 could be adjusted so that a substantially stoichiometric ratio between the fuel and oxygen in the cathode flowpath 350 can be maintained. A feedback-based controller (not shown) can be included, and based on signals transmitted by oxygen sensor 380, can be used to keep the desired fuel-to-oxygen ratio in the fluid passing through the recirculation loop 352. Once the oxygen has been purged from the anode 310, the anode 310 may then be filled with hydrogen to begin normal operation. At this time (if not before), the fuel inerting valve 344 and the purge valve 346 would be closed, while the fuel supply valve 342 would be opened. During normal operation, the flow of fuel can be adjusted in a manner similar to that discussed above, including the use of a controller. Air can be bled into the anode 310 by opening the purge valve 346. Similarly, hydrogen can be bled into the cathode 330 by opening fuel inerting valve 344, thus providing additional heating to assist startup when the fuel cell 300 is exposed to low temperature environments.

Figure 3:
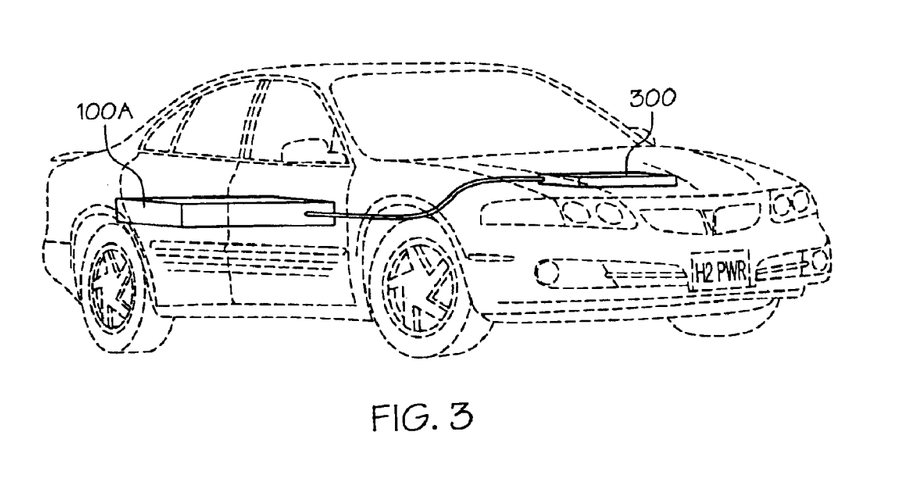
FIG. 3 shows a vehicle employing the fuel cell system of either FIG. 2A or FIG. 2B.

Referring next to FIG. 3 in conjunction with FIG. 1, a vehicle incorporating a fuel cell system according to the present invention is shown. Fuel cell 300 is fluidly coupled to a fuel supply 100A. While the vehicle is shown notionally as a car, it will be appreciated by those skilled in the art that the use of fuel cell systems in other vehicular forms is also within the scope of the present invention.

While certain representative embodiments and details have been shown for purposes of illustrating the invention, it will be apparent to those skilled in the art that various changes may be made without departing from the scope of the invention, which is defined in the appended claims.

What is claimed is:

1. A method of operating a fuel cell system, said method comprising:
    configuring said system to include:
        at least one fuel cell comprising an anode, a cathode and a membrane disposed between said anode and cathode;
        an anode flowpath configured to couple said anode to a fuel source; and
        a cathode flowpath configured to couple said cathode to an oxygen source, said cathode flowpath including a recirculation loop disposed therein;
    decoupling said anode from said fuel source;
    recycling fluid disposed in said cathode flowpath through said recirculation loop;
    introducing fuel into said recirculation loop;
    reacting said fuel with said recycled fluid unit said recycled fluid becomes substantially oxygen-depleted; and
    introducing said substantially oxygen-depleted fluid into said anode flowpath such that any fluid previously resident therein is substantially purged therefrom.

2. The method according to claim 1, wherein said step of configuring said system comprises the additional step of fluidly coupling a pressure source to at least one of said fuel source and said oxygen source.

3. The method according to claim 2, comprising the additional step of pressurizing fluid contained within said recirculation loop.

4. The method according to claim 1, wherein said recycling step further comprises closing a cathode exit valve disposed within said recirculation loop.

5. The method according to claim 4, wherein said recycling step further comprises opening a cathode flowpath recycle valve disposed within said recirculation loop.

6. The method according to claim 1, wherein said step of introducing said substantially oxygen-depleted gas into said anode flowpath comprises opening a purge valve that fluidly couples said cathode flowpath to said anode flowpath.

7. The method according to claim 6, wherein said purge valve is disposed between said cathode and a cathode exit valve.

8. The method according to claim 1, wherein said step of introducing fuel into said recirculation loop comprises adjusting a fuel inerting valve that fluidly couples said anode flowpath to said cathode flowpath.

9. The method according to claim 1, wherein said system defines at least a first operational state where said system is generating electricity, a second operational state where said system is not generating electricity, and a third operational state transiently between said first and second operational states.

10. The method according to claim 9, wherein said decoupling, recycling, reacting and both introducing steps comprise said third operational state.

11. The method according to claim 9, further comprising the step of filling said anode flowpath with fuel once said substantially oxygen-depleted fluid has substantially purged said anode flowpath.

12. The method according to claim 11, wherein said step of filling said anode flowpath with fuel once said substantially oxygen-depleted fluid has substantially purged said anode flowpath comprises fluidly isolating said anode flowpath from said cathode flowpath, and fluidly coupling said fuel source to said anode.

13. The method according to claim 12, wherein said step of fluidly isolating said anode flowpath from said cathode flowpath comprises closing a purge valve disposed therebetween.

14. The method according to claim 12, wherein said step of fluidly isolating said anode flowpath from said cathode flowpath further comprises closing a fuel inerting valve disposed therebetween.

15. The method according to claim 12, wherein said step of fluidly coupling said fuel source to said anode comprises opening a fuel supply valve disposed within said anode flowpath.

16. The method according to claim 11, comprising the additional step of placing said system in said first operational state.

17. The method according to claim 16, comprising the additional step of adjusting flow of said fuel until steady state operation is achieved.

18. The method according to claim 11, comprising the additional step of bleeding fluid from said oxygen source into said anode to assist said first operational state.

19. The method according to claim 18, wherein said bleeding step comprises opening a purge valve that fluidly couples said cathode flowpath to said anode flowpath.

20. The method according to claim 11, comprising the additional step of bleeding fuel from said fuel source into said cathode to assist said first operational state.

21. The method according to claim 20, wherein said step of bleeding fuel into said cathode comprises opening a fuel inerting valve that fluidly couples said anode flowpath and said cathode flowpath.

22. The method according to claim 1, comprising the additional step of regulating the amount of fuel being introduced into said cathode flowpath in order to maintain a substantially stoichiometric ratio between said fuel and said oxygen present in said recirculating fluid at least until said oxygen is substantially consumed in said reacting step.

23. The method according to claim 22, wherein said step of regulating the amount of fuel comprises:
    sensing the amount of oxygen present in said recirculating fluid; and
    adjusting a fuel inerting valve that fluidly couples said anode flowpath to said cathode flowpath by an amount necessary to maintain said substantially stoichiometric ratio.

24. The method according to claim 1, wherein said fuel is hydrogen-rich.

25. The method according to claim 24, wherein said fuel is selected from the group consisting of methanol, hydrogen, methane and gasoline.

26. The method according to claim 1, wherein said oxygen source comprises air.

27. The method according to claim 1, wherein said reacting step takes place in a combustor that is fluidly coupled to said cathode flowpath.

28. The method according to claim 27, comprising the additional step of cooling products produced during said reacting step.

29. The method according to claim 28, comprising the additional step of disposing a cooler between said combustor and said at least one fuel cell to effect said cooling step.

30. The method according to claim 1, wherein said reacting step takes place on a catalyst disposed on said cathode.

31. The method according to claim 1, wherein said step of introducing said substantially oxygen-depleted fluid into said anode flowpath comprises fluidly coupling said cathode flowpath downstream of said cathode with an inlet location in said anode.

32. The method according to claim 1, comprising the additional step of filling said anode flowpath with air once said previously resident fuel has been substantially purged therefrom.

33. The method according to claim 32, wherein said step of filling said anode flowpath with air is effected by closing a fuel inerting valve and opening a purge valve, each of said valves disposed between said anode flowpath and said cathode flowpath.

34. The method according to claim 1, wherein said step of decoupling said anode from said fuel source is accomplished by closing a fuel supply valve.

35. A method of preparing a fuel cell system for startup, said method comprising:
    configuring said system to comprise:
        at least one fuel cell comprising an anode, a cathode and a membrane disposed between said anode and cathode;
        an anode flowpath configured to couple said anode to a fuel source;
        a cathode flowpath configured to couple said cathode to an oxygen source, said cathode flowpath including a recirculation loop disposed therein; and
        a plurality of valves configured to establish fluid communication between said anode flowpath and said cathode flowpath;
    introducing fuel from said feel source into said cathode flowpath;
    recycling fluid disposed in said cathode flowpath through said recirculation loop;
    introducing fuel into said recirculation loop;
    reacting said fuel with said recycled fluid until said recycled fluid becomes substantially oxygen-depleted; and
    introducing said substantially oxygen-depleted fluid into said anode flowpath such that any fluid previously resident therein is substantially purged therefrom.

36. The method according to claim 35, wherein said step of introducing said substantially oxygen-depleted fluid comprises opening a purge valve that fluidly couples said anode flowpath to said cathode flowpath, and subsequently opening a fuel supply valve that fluidly couples said fuel source to said anode.

37. The method according to claim 36, comprising the additional step of bleeding fluid from said oxygen source into said anode to facilitate low temperature starting.

38. The method according to claim 37, wherein said step of bleeding air into said anode comprises opening a purge valve disposed between said cathode flowpath and said anode flowpath.

39. The method according to claim 36, comprising the additional step of bleeding fuel from said fuel source into said cathode to facilitate low temperature starting.

40. The method according to claim 39, wherein said bleeding fuel step comprises opening a fuel inerting valve that fluidly couples said anode flowpath to said cathode flowpath.

41. A method of transiently operating a fuel cell system, said method comprising:
    configuring said system to define at least a first operational state where said system is generating electricity and a second operational state where said system is not generating electricity, said system comprising:
        at least one fuel cell comprising an anode, a cathode and a membrane disposed between said anode and cathode;
        an anode flowpath configured to couple said anode to a fuel source;
        a cathode flowpath configured to couple said cathode to an oxygen source, said cathode flowpath including a recirculation loop disposed therein;
        at least one valve disposed within said recirculation loop to selectively allow recirculation of fluid therethrough;
        a purge valve that fluidly couples said cathode flowpath to said anode flowpath;
        a fuel inerting valve that fluidly couples said anode flowpath to said cathode flowpath; and
        a pressure source coupled to said oxygen source;
    placing said system in one of said first or second operational states;
    decoupling said anode from said fuel source;
    arranging said at least one valve disposed in said recirculation loop such that said fluid pressurized by said pressure source can be recycled therethrough;
    arranging said fuel inerting valve such that fuel can be introduced from said fuel source into said cathode flowpath;
    reacting said fuel with said recycled fluid until said recycled fluid becomes substantially oxygen-depleted; and
    opening said purge valve such that said substantially oxygen-depleted fluid is introduced into said anode flowpath, thereby substantially purging said anode flowpath.

* * * * *